United States Patent [19]
Daniels

[11] Patent Number: 4,923,053
[45] Date of Patent: May 8, 1990

[54] FLEXIBLE MEMBER MOUNTING ASSEMBLY

[75] Inventor: Dale R. Daniels, Cupertino, Calif.

[73] Assignee: Ampex Corporation, Redwood City, Calif.

[21] Appl. No.: 138,908

[22] PCT Filed: Apr. 10, 1987

[86] PCT. No.: PCT/US87/00824

§ 371 Date: Dec. 1, 1987

§ 102(e) Date: Dec. 1, 1987

[87] PCT Pub. No.: WO87/06215

PCT Pub. Date: Oct. 22, 1987

Related U.S. Application Data

[63] Continuation-in-part of Ser. No. 851,034, Apr. 11, 1986, abandoned.

[51] Int. Cl.⁵ .............................................. B66B 9/00
[52] U.S. Cl. ..................................... 187/1 R; 414/281; 901/16
[58] Field of Search ..................... 187/1 R, 20, 7; 414/281, 282, 283, 284; 901/16, 50; 221/88; 248/52, 61; 74/89.22

[56] References Cited

U.S. PATENT DOCUMENTS

| | | | |
|---|---|---|---|
| 3,840,131 | 10/1974 | Castaldi | 414/281 |
| 4,534,006 | 8/1985 | Minucciani et al. | 901/16 |
| 4,820,109 | 4/1987 | Witt | 901/16 |

FOREIGN PATENT DOCUMENTS

| | | | |
|---|---|---|---|
| 0191636 | 8/1986 | European Pat. Off. | 221/88 |
| 0446049 | 12/1974 | U.S.S.R. | 901/50 |

Primary Examiner—Joseph J. Rolla
Assistant Examiner—Kenneth Noland
Attorney, Agent, or Firm—Harry G. Thibault; Richard P. Lange

[57] ABSTRACT

A mounting assembly is provided for supporting an elongated flexible member, such as an electrical signal cable, connected between relatively movable termination points, for example, between a stationary frame and a mobile carriage. The mounting assembly comprises one or more track units each including a guide channel having one side opening toward an adjacent, generally parallel roller-supported belt. The flexible member is anchored at a first termination point generally at a longitudinally centered position within the channel and extends along the channel before rolling back upon itself through a turn of 180 degrees to contact the belt, with the channel-belt spacing being less than twice a natural radius of curvature for the flexible member whereby the belt applies a force against the flexible member in the region of the turn. The flexible member extends from the curved loop along the belt and is secured thereto at a second termination point. Upon translation of the belt, the second termination point and the portion of the flexible member attached thereto are displaced in the direction of the belt translation, with the flexible member rolling smoothly and in a stable manner between the guide member and the belt at the turn thereof.

29 Claims, 6 Drawing Sheets

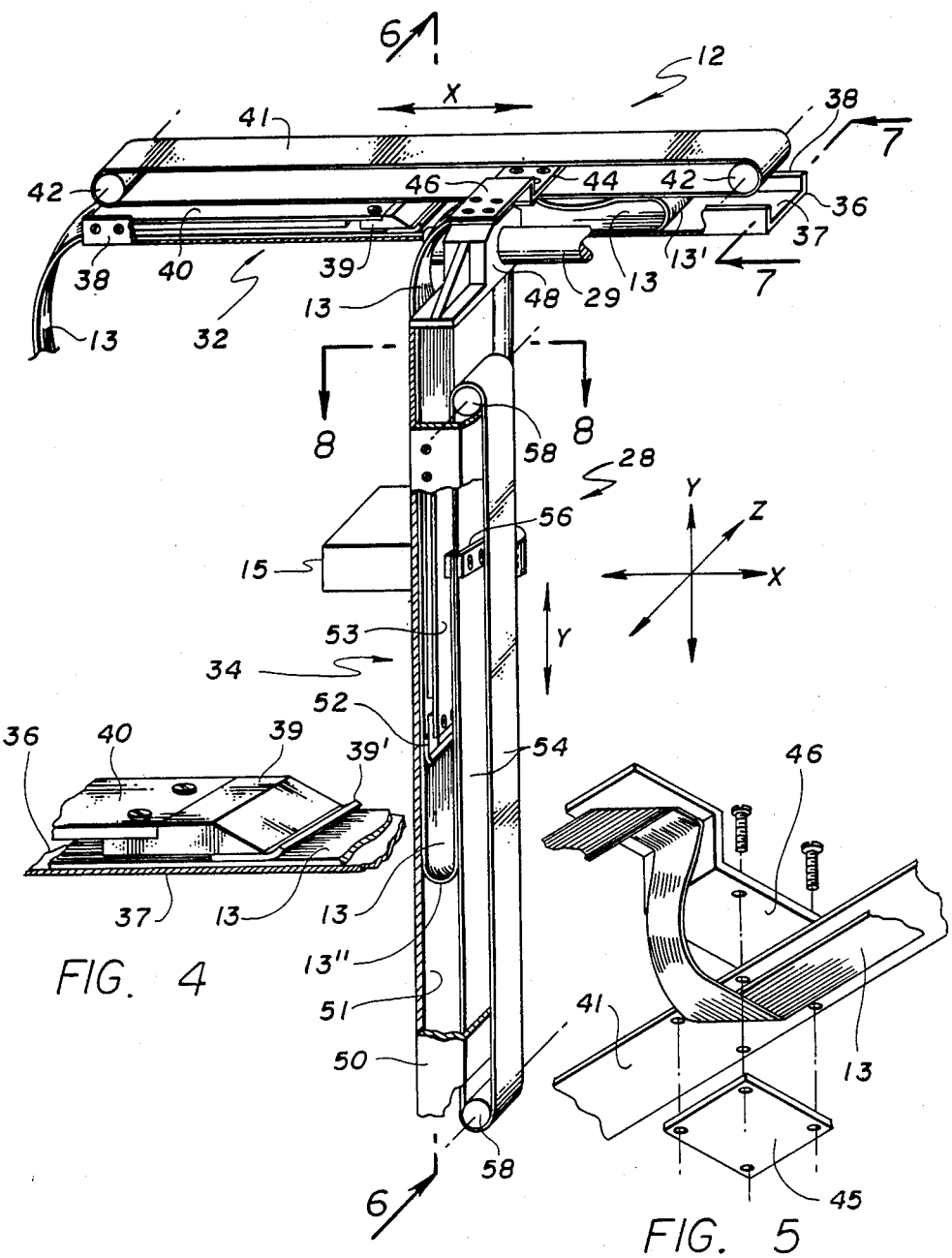

FLEXIBLE MEMBER MOUNTING ASSEMBLY

The present application is a continuation-in-part of application Ser. No. 851,034, filed Apr. 11, 1986, now abandoned.

BACKGROUND OF THE INVENTION

This invention relates generally to apparatus and methods for supporting and guiding an elongated flexible member between relatively movable termination points, such as, for example, a flexible cable connected between points on a stationary frame and a component movable with respect to the frame. More particularly, this invention relates to a mounting assembly designed for supporting and guiding an elongated flexible member such as a cable throughout relatively rapid movements including directional changes and related accelerations with minimal mechanical stresses or frictional wear to ensure long term reliability.

In the past, many different mechanical and electromechanical devices have included relatively movable components requiring some type of elongated flexible member such as a cable or like interconnection between the components. For example, many such devices have required an electrical conductor cable to be connected between relatively movable structures for purposes of supplying electrical power and/or a variety of electrical control signals. Other such devices have required pneumatic or hydraulic tubing connections or other types of flexible connections between, for example, a main stationary frame and a movable component of a machine. In each instance, the flexible interconnection must be designed to supply the movable component with the appropriate electrical signal, fluid, or similar input while exhibiting sufficient flexibility to accommodate the direction, range, and speed of motion of the movable component. However, when the movable component is designed for relatively rapid and/or multidirectional movements, particularly with frequent and rapid accelerations and decelerations, available flexible connectors have not provided satisfactory fatigue life and resistance to mechanical wear.

More particularly, by way of one specific example, video cassette storage and playback systems have been proposed for use by television broadcast stations for automated transfer of video cassettes between a storage library and playback equipment, thereby permitting automated or semi-automated station operation with selected prerecorded programs or commercial messages being played according to a timed, preprogrammed sequence. In such systems, a mobile carriage including a cassette pick-up and release unit is transported by a multidirectional transfer mechanism back and forth, for example, within a X-Y plane, between the storage library and the playback equipment to select, transfer, play and return to the library selected cassettes. The pick-up unit includes appropriate movable components for engaging and releasing the cassettes in accordance with various commands communicated thereto via a multiple conductor flexible cable. However, when the system is designed for rapid displacements of the pick-up unit to meet the cassette changeover timing demands of a modern broadcast station, the flexible cable can be subjected to significant mechanical loads and/or sliding friction resulting in premature cable failure. This is particularly true in the event the cable is freely suspended between two relatively movable components, wherein high accelerations and decelerations create the relative movement which thrashes the cable about, resulting in cable damage.

In the past, a variety of flexible conductor cable designs have been proposed in attempts to increase cable life span while permitting sufficient freedom of cable motion to track the moving component or components. For example, spirally coiled conductor cables have been commonly used, but such cables tend to flap about when subjected to rapid accelerations and/or directional changes. Attempts to constrain a spirally coiled cable against flapping have met with little success due to increased frictional wear as the cable slides relative to the constraining apparatus. Other designs have utilized spring-loaded arrangements to apply a constant spring tension to a multiconductor flat ribbon cable throughout various cable movements, but these designs undesirably subject the cable to significant tension loads with resultant decrease in operating life. Still other proposals have envisioned threading a flat ribbon cable through a chain of pivoted links, but such links have tended to be relatively noisy during rapid displacements and further are not well-suited for accommodating cable motion along multiple axes.

In many hydraulic and pneumatic equipment applications, flexible tubing is frequently connected between two relatively movable components to convey fluid and/or pressure signals therebetween. In the past, such flexible tubing has typically been suspended freely between the movable components. However, when relatively high accelerations, decelerations and/or component transport speeds are required, freely suspended tubing will thrash about to slap against adjacent structures and apply high stress upon coupling members provided at the ends of the tubing, all resulting in early failures of the tubing and the coupling members.

There exists, therefore, a significant need for an improved apparatus and method for movably mounting and supporting an elongated flexible member connected between relatively movable components, wherein the mounting arrangement permits rapid movements and accelerations of the flexible member to accommodate positional changes of a moving component along one or more directions, and without subjecting the flexible member to significant mechanical loads or significant sliding friction. The present invention fulfills these needs and provides further related advantages.

SUMMARY OF THE INVENTION

In accordance with the invention, an improved mounting assembly is provided for controlled movement of a flexible member. The mounting assembly includes a guide provided on a stationary frame for receiving the flexible member which is connected between a first termination point on the guide and a second termination point on a movable structure disposed adjacent to the guide. From the first termination point, the flexible member extends along the guide and then folds back upon itself through a turn of about 180 degrees to be constrained between the guide and the moveable structure. Importantly, the spacing between the guide and the movable structure is slightly less than twice a natural radius of curvature for the flexible member wherein the natural radius of curvature is the radius assumed by the flexible member when folded back upon itself through a turn of 180° in the absence of external forces applied to the flexible member in the region of the turn. Accordingly, such a spacing assures that a force is applied to the flexible member in the region of the turn, which force is sufficient to induce a rolling movement of the flexible member at the turn which accompanies the translatory movement of the moveable structure relative to the guide, but is insufficient to induce a permanent set in the flexible member. When the movable structure is translated back and forth, the portion of the flexible member between the second termination point and the turn is displaced with the movable structure, with that portion of the member in the turn rolling smoothly between the movable structure and the guide on the stationary frame as the flexible member tracks the position of the movable structure. Importantly, the mounting assembly permits such tracking movement with minimal mechanical loading of the flexible member and substantially without sliding friction applied to the flexible member, thereby enhancing long term reliability of operation.

In one preferred form of the invention, the flexible member mounting assembly includes one or more track units each comprising an elongated open-sided guide for receiving therein a flexible member, such as a flexible flat ribbon cable including a plurality of conductors for carrying various power and/or control signals. A clamp secures the flexible member at a first termination point along the guide generally at a position intermediate the guide length. From the clamp, the flexible member extends further along the guide and is then rolled back upon itself through a turn of 180 degrees. A movable wall in the form of a drive belt supported on rollers overlies the guide in parallel relation thereto, with a spacing between the drive belt and the guide chosen to be slightly less than twice the natural radius of curvature of the flexible member. Accordingly, such spacing assures that a force is applied to the flexible member in the region of the turn. From the turn, the flexible member extends further along the drive belt and is connected thereto by a second clamp to define a second termination point.

In operation, the drive belt is translated back and forth over the guide to displace the flexible member at the second termination point in one direction relative to the first termination point. During this displacement, the force interaction at the turn of the flexible member between the belt and the flexible member results in an effective second point of driving engagement between the drive belt and the flexible member, whereby the flexible member is translated substantially without sliding friction and further without risk of cable buckling. If desired, a support shelf can be interposed between the drive belt and the guide at a location spaced from the turn to prevent portions of the flexible member on opposite sides of the turn from drooping into sliding frictional contact with each other when the distance between the drive belt clamp and the cable turn is relatively large.

When positional changes along an additional direction are desired, a second track unit can be mounted for movement with the drive belt of the first track unit. The flexible member extends further from the second termination point on the drive belt of the first track unit to a guide of the second track unit. The flexible member extends along the guide of the second track unit and is then folded back upon itself through a turn of 180 degrees to press against and ultimately for connection to a roller-supported drive belt of the second track unit. Translation of this latter drive belt relative to the associated guide thus displaces the flexible member in a second direction, in accordance with the directional orientation of the second track unit.

In one preferred system application, first and second track units are provided to support a flat ribbon conductor cable extending between a stationary frame and a cassette pick-up and release unit movable throughout an X-Y plane of motion to transfer video cassettes between a cassette storage library and adjacent cassette playback equipment. The pick-up unit is mounted for Y-axis movement relative to a mobile column assembly which in turn is supported from the frame for X-axis displacement. The first track unit supports the conductor cable to extend between the stationary frame and a movable termination point on a drive belt for the first track unit, wherein this drive belt is movable with the column assembly in the X-axis direction. From this movable termination point on the drive belt for the first track unit, the cable extends further to the second track unit on the column assembly for connection to the associated drive belt which is mounted for movement in the Y-axis direction along with the pick-up unit.

Other features and advantages of the present invention will become more apparent from the following detailed description, taken in conjunction with the accompanying drawings which illustrate, by way of example, the principles of the invention.

BRIEF DESCRIPTION OF THE DRAWINGS

FIG. 3 is a diagrammatic perspective view depicting the flexible member mounting assembly including a pair of track units for bidirectional displacement of a flexible member;

FIG. 4 is an enlarged fragmented perspective view depicting a clamping foot for securing the flexible member at one termination point within one of the track units;

FIG. 5 is a fragmented exploded perspective view depicting clamp plates for securing the flexible member to a second movable termination point within one of the track units;

DETAILED DESCRIPTION OF THE PREFERRED EMBODIMENT

Figure 10:
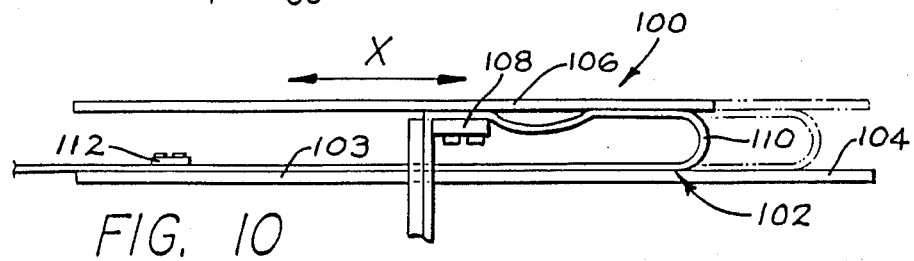
FIG. 10 is a somewhat schematic perspective view illustrating the general construction and creation of a flexible member mounting assembly in accordance with the invention.

The flexible member mounting assembly of the present invention is referred generally by the reference numeral 100 in FIG. 10, which depicts an elongated flexible member 102 disposed between frame components adapted for movement with respect to each other. The flexible member 102 is connected between the frame components in a manner permitting the flexible member 102 to track or follow the relative movements of the frame components without subjecting the flexible member 102 to harmful or other objectionable mechanical and/or friction loads.

The flexible member 102 may comprise any of a wide variety of the flexible connecting devices which may be required in a wide variety of systems for connection between relatively movable mechanical structures. For example, in a preferred form of the invention to be discussed in more detail herein, the flexible member 102 may comprise an electrical signal-carrying conductor or cable including a plurality of conductors, such as a flat ribbon conductor cable. Alternatively, the flexible member 102 may comprise a flexible length of hollow tubing for use, for example, in conveying fluids in hydraulic or pneumatic systems. Still further, the flexible member 102 may comprise any other type of flexible device connected between relatively movable structures, with the mounting assembly of the present invention supporting and guiding the flexible member 102 as it flexes to accommodate the relative structural movements. Importantly, the mounting assembly is designed to support and guide the flexible member 102 in a manner permitting rapid accelerations and decelerations as well as rapid velocities between the relatively movable structures.

FIG. 10 depicts the general components of the flexible member mounting assembly 100 to include a stationary frame 104 in combination with a movable frame component 106. The flexible member 102 is secured at a first termination point on the stationary frame 104 by a clamp 108 or other suitable connector means. From the clamp 108, the flexible member 102 extends along a guide 103 provided on the stationary frame 104, which supports and guides the flexible member 102 as it extends from the clamp 108 to a turn 110, whereat the flexible member 102 is folded or rolled directly back upon itself through a turn of 180 degrees. From the turn 110, the flexible member 102 extends along and is guided by the mobile frame component 106 to a second termination point where a clamp 112 or other suitable fastener is provided to secure the flexible member 102 to the mobile component 106. Importantly, the shapes of the stationary frame 104 and the mobile component 106 which support and guide the flexible member 102 mirror each other with a substantially constant spacing therebetween, such as the substantially parallel surfaces depicted in FIG. 10, for guiding the translation of the flexible member 102 in an X-axis direction. Alternatively, other constant spaced shapes such as curved arcs can be used for guiding the flexible member 102 through a non-linear path, if desired.

According to a primary aspect of the invention, the spacing between the supporting surfaces of the stationary frame 104 and the mobile component 106 is slightly less than twice a natural radius of curvature of the flexible member 102, wherein the natural radius of curvature is the radius assumed by the flexible member 102 when folded back upon itself through a turn of 180 degrees in the absence of external forces applied to the flexible member 102 in the region of the turn 110. As a result, the mobile component 106 provides a moving wall relative to the stationary frame 104, which presses against the flexible member 102 in the region of the turn 110 to reduce slightly the radius of curvature. Accordingly, when the mobile component 106 is translated back and forth in the illustrative X-axis direction the portion of the flexible member 102 between the turn 110 and the second termination point is displaced smoothly and without sliding friction or buckling as the flexible member 102 rolls smoothly through the turn 110 to accommodate increases and decreases in the distance between the second termination point and the turn 110, as viewed in the solid lines and dotted lines of FIG. 10. The present invention can also accommodate relative motion of the flexible member 102 along one or more additional directional axes, as described in detail in a preferred embodiment of the present invention set forth below.

Figure 1:
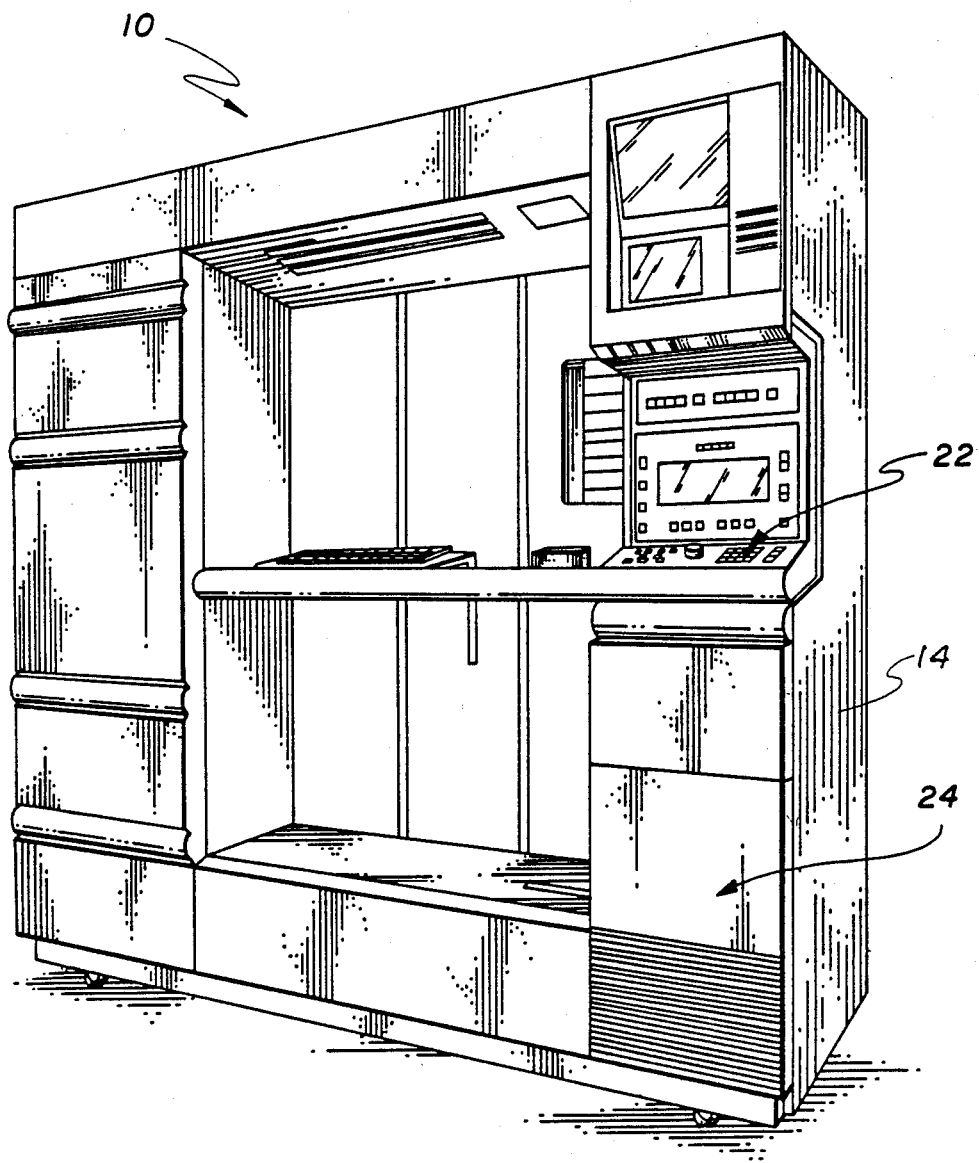
FIG. 1 is a front perspective view illustrating a video cassette storage and playback system incorporating an improved flexible member mounting assembly embodying the novel features of the invention.

A preferred embodiment of the present invention will now be described with respect to FIGS. 1-9 which illustrate a flexible conductor cable implementation adapted for a video cassette storage and playback system referred to generally by the reference numeral 10 in FIGS. 1 and 2. The cassette storage and playback system 10 incorporates a flexible member mounting assembly 12 (FIG. 2) constructed in accordance with the present invention for supporting a flexible member such as a conductor cable 13 connected between a stationary frame 14 and a mobile cassette pick-up and release unit 15. In general, the cassette pick-up unit 15 is mounted on and movably carried by a bidirectional transfer mechanism 16 designed to displace the pick-up unit 15 rapidly and in a precision manner throughout an X-Y plane for picking up and transferring selected video cassettes 17 between a storage library 18 and adjacent playback equipment 20. The cable 13 supplies the pick-up unit 15 with electrical power and/or various control signals for performing the requisite cassette transfer operations, while the mounting assembly 12 supports the cable 13 in a secure and stable manner capable of tracking the pick-up unit throughout rapid back and forth movements without experiencing objectionable cable mechanical loads, stresses, or frictional wear.

The illustrative cassette storage and playback system 10 is designed primarily for use by television broadcast stations and the like for automated playback of prerecorded programming including, for example, commercial messages, regular programs, or any other programming recorded on the video cassettes 17 stored within the storage library 18. The system 10 comprises the frame or cabinet 14 having a front control console 22 (FIG. 1) and a processing unit 24 for controlling system operations, as will be described. A plurality of the prerecorded video cassettes 17 are stored within the library 18 at individually coded, designated locations within rearwardly open bins 26. The transfer mechanism 16 includes drive means 27, such as the illustrative cable/pulley drive apparatus controlled by the processing unit 24 for displacing an upright column assembly 28 back and forth in an X-axis direction guided by upper and lower parallel stationary rails 29 (FIGS. 3 and 6), and for displacing the pick-up unit 15 up and down in a Y-axis direction guided by a support post 30 forming part of the column assembly 28. The transfer mechanism 16 thus displaces the pick-up unit 15 generally within an X-Y plane at the rear of the frame 14 between alignment with selected storage bins 26 and one or more playback units 20 each including a chamber 20' for receiving one of the video cassettes. The pick-up unit 15 includes appropriate mechanisms and controls for picking up and releasing the cassettes 17 one at a time thereby permitting operation under the control of the processing unit 24 to engage and withdraw the cassettes from their respective bins for insertion into the playback units, followed by return of the cassettes to their storage bins. However, the detailed constructions of the transfer mechanism 16 and the pick-up unit 15 do not form a part of the present invention and thus are not described in further detail herein.

The flexible member mounting assembly 12 of the present invention provides a relatively simple yet highly effective apparatus and method for supporting the cable 13 between the stationary frame 14 and the mobile pick-up unit 15. The mounting assembly thus permits electrical power and/or control signals to be coupled to the mobile component which is designed to move throughout the X-Y plane with relatively rapid starts and stops and with relatively rapid displacement speeds. The mounting assembly advantageously supports the cable 13 for rapid translation to track the multi-directional movements of the pick-up unit 15 but without subjecting the cable to harmful or other objectionable mechanical loads or wear due to sliding friction.

Figure 2:
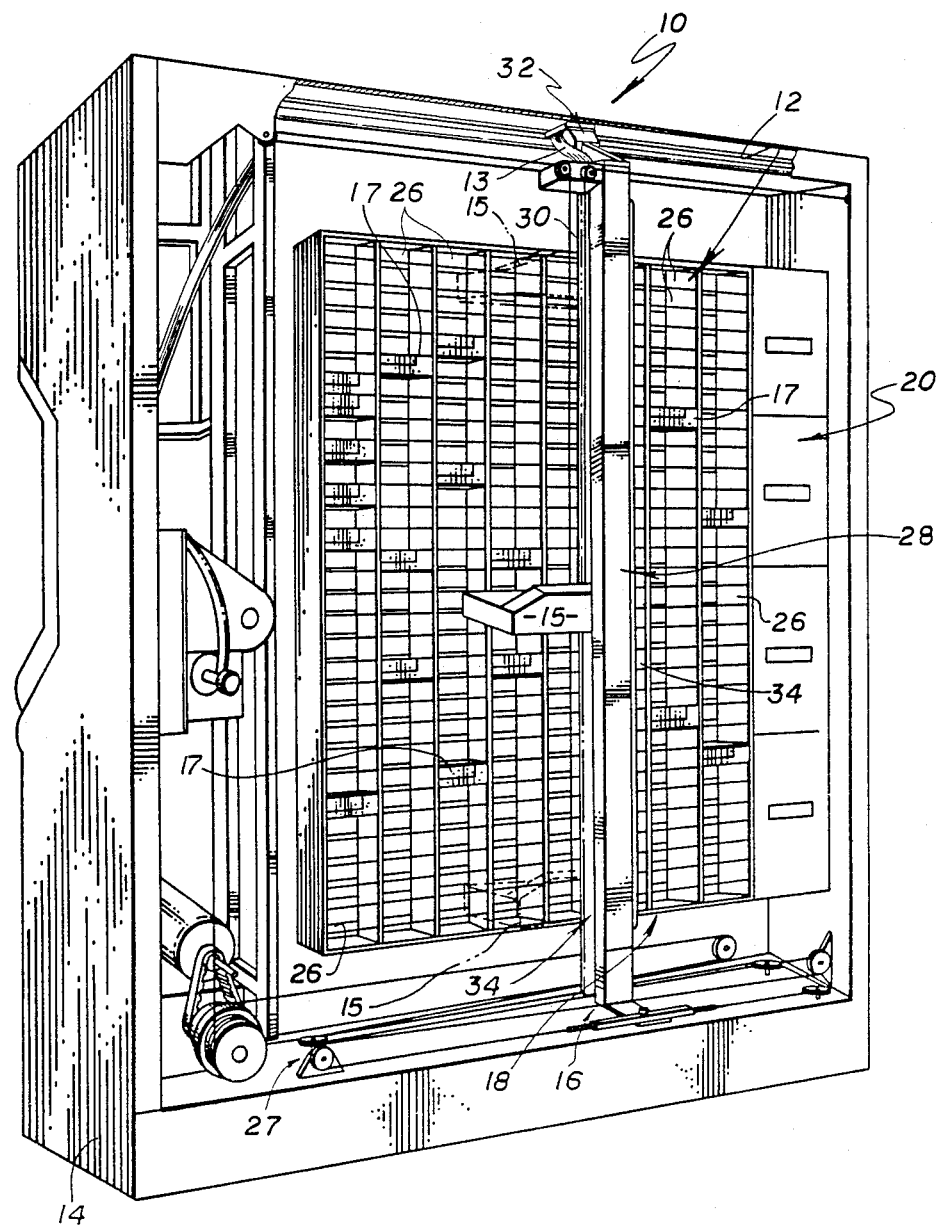
FIG. 2 is an elongated rear perspective view of the system of FIG. 1 and showing the flexible member mounting assembly included therein.
Figure 6:
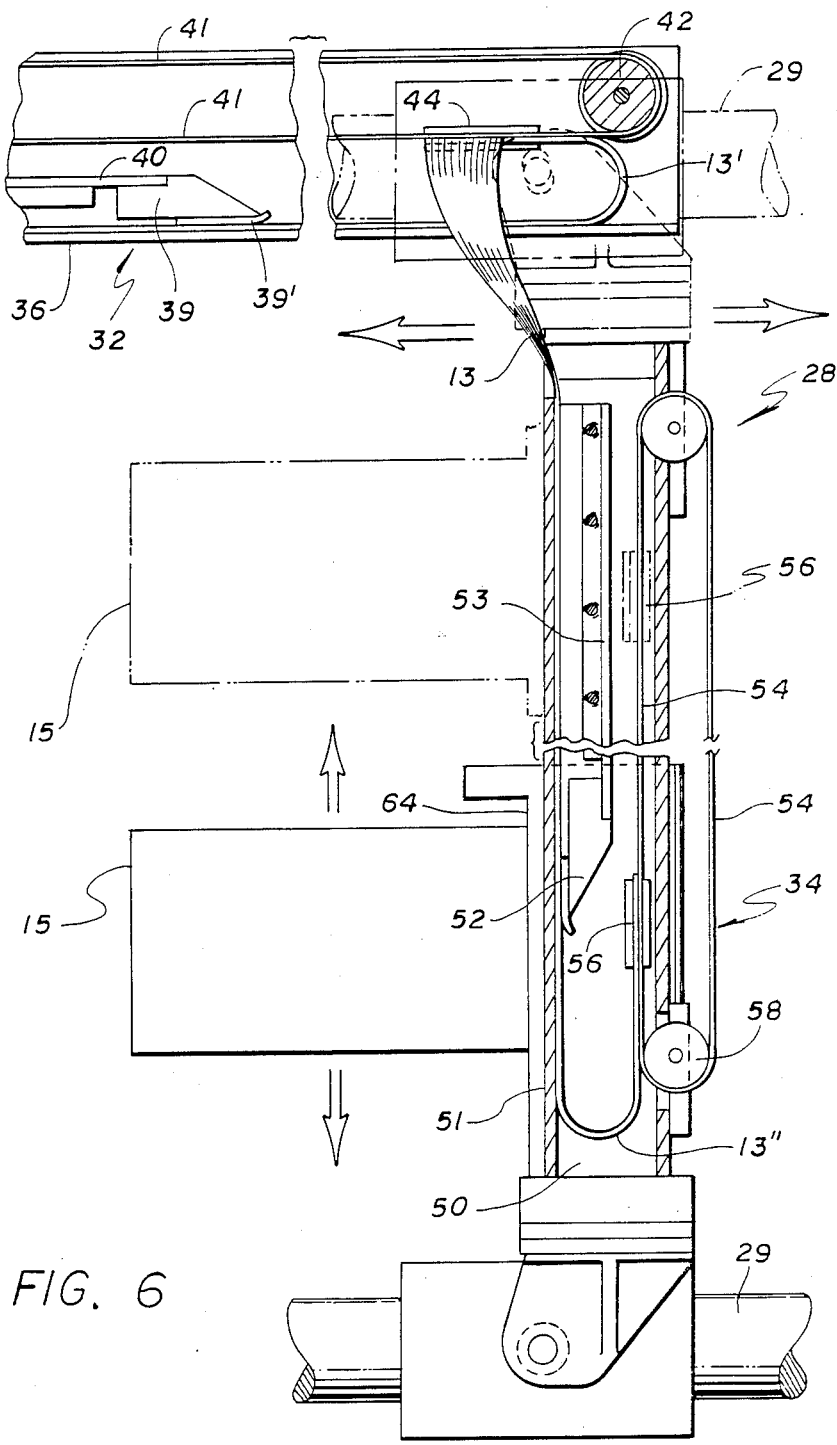
FIG. 6 is an enlarged fragmented elevation view taken generally on the line 6—6 of FIG. 3.

As shown generally in FIGS. 2 and 3, the illustrative mounting assembly 12 comprises an upper guide or track unit 32 generally oriented horizontally and designed to accommodate cable movement in the X-axis direction, together with a lower, generally vertically oriented guide or track unit 34 designed to accommodate cable movement in the Y-axis direction. Together, the two track units 32 and 34 support the cable 13 for rapid movement throughout the X-Y plane to track displacement of the pick-up unit 15 and thereby permit secure cable connection to the pick-up unit. Additional dimensions of cable movement can be provided, if desired, by providing one or more additional track units.

More specifically as shown best in FIG. 3, the upper track unit 32 comprises an elongated generally, U-shaped guide channel 36 mounted securely onto the frame 14 in any suitable manner. This guide channel 36 is oriented to extend generally in the X-axis direction and with its open side presented upwardly. The cable 13, shown in one preferred form as a multiple conductor flat ribbon cable, extends from an appropriate power/signal connection site (not shown) such as connection to the processing unit 24 (FIG. 1) into a cable entrance end 57 of the guide channel 36 to lie generally flush along the base 37 of the guide channel. A pair of relatively short upstanding side walls 38 on the guide channel confine the cable 13 within the channel and prevent displacement therefrom in a Z-axis direction.

Within the guide channel 36, the cable 13 is secured at a first or stationary termination point by means of a clamping foot 39. In the preferred form, as shown in FIGS. 3 and 4, the clamping foot 39 comprises a clamp block 39a secured by screws or similar fasteners 39b at one end of a secondary support shelf 40 spanning the guide channel side walls and extending from the clamp block along the channel 36 toward the cable entrance end 57. A clamp toe 39' of copper plate or the like is fastened to the underside of the clamp block and functions to securely seat the cable 13 onto the guide channel base 37. Importantly, for optimum X-axis range of motion, the clamping foot 39 secures the cable generally at or near a longitudinally centered position within the channel 36.

From the clamping foot 39, the cable 13 extends further along the base 37 of the guide channel 36 to a cable turn 13' whereas the cable is rolled back upon itself and through an angle of 180 degrees to extend in the opposite direction. The cable turn 13' occurs beneath an overlying drive belt 41 of closed loop woven cloth or the like supported on the frame 14 generally in parallel with and in slightly spaced relation above the guide channel 36. The drive belt 41 is supported by rollers 42 oriented for rotation about an axis extending in the Z-axis direction thereby permitting X-axis drive belt displacement relative to the frame 14 and the underlying guide channel 36. A belt clamp 44 (FIGS. 3 and 5) secures the cable 13 to the drive belt 41 thereby defining a second cable termination point which is movable relative to a first termination point defined at the clamping foot 39.

In accordance with one primary aspect of the invention, the vertical spacing between the lower run of the drive belt 41 and the base 37 of the guide channel 36 is chosen to be somewhat less than twice the natural radius of curvature of the cable 13 at the cable turn 13'. With this arrangement, the cable turn 13' is slightly compressed between the belt 41 and the channel base 37 whereby the belt effectively applies a force acting upon the cable 13. Accordingly, when the belt is translated back and forth on the rollers 42, the drive belt 41 engages and drives the cable 13 at two points, namely, at the belt clamp 44 and at the cable turn 13' due to the resultant contact force between the cable and belt. In this regard, the drive belt 41 is selected from a material having a sufficient coefficient of friction relative to the cable 13 to insure positive rolling action of the cable 13 through the turn 13' substantially without sliding motion or resulting sliding friction between the cable 13 or the belt 41. The drive belt 41 can thus be translated back and forth rapidly in the X-axis direction to displace the movable second termination point of the cable 13 with little or no cable wear.

The secondary support shelf 40 is conveniently located at the side of the clamping foot 39 opposite the cable turn 13' to provide an auxiliary support structure between the guide channel 36 and overlying belt 41. This support shelf 40 is positioned to support vertically drooping portions 113 (FIG. 3) of the cable 13 to prevent excessive cable droop when the belt 41 is translated to a position with some of the cable over the shelf 40, thereby preventing undesirable sliding contact between upper and lower portions of the cable 13. In this regard, it is noted that excessive drooping of the cable 13 may otherwise occur when the belt 41 is translated to a position providing a substantial distance between the clamp 44 and the cable turn 13'. In addition, to further minimize cable wear, the cable contacted surfaces of the channel 36 and shelf 40 can be formed by or lined with a low friction material such as Teflon.

Figure 7:
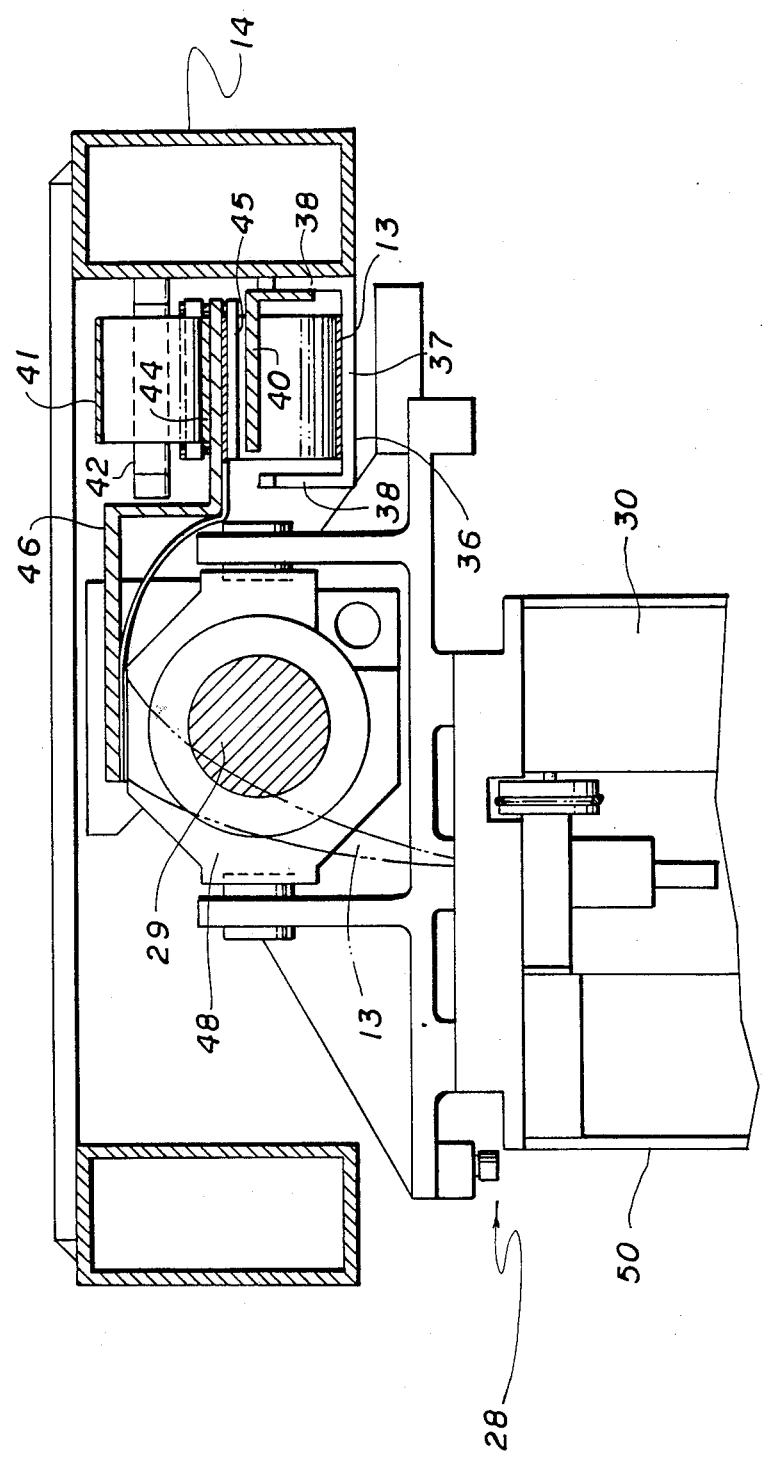
FIG. 7 is an enlarged fragmented vertical sectional view taken generally on the line 7—7 of FIG. 3.

The drive belt 41 of the track unit 32 is conveniently translated about the rollers 42 by connection with the column assembly 28 which is translated in the X-axis direction by the drive means 27 (FIG. 2). More specifically, as shown in FIGS. 3, 5 and 7, the cable clamp 44 includes a lower clamp plate 45 and an upper clamp bracket 46 fastened onto the cable by screws or the like, wherein the bracket 46 is cantilevered to one side of the belt 41 for attachment to a bearing member 48 at the upper end of the column assembly 28. This bearing member 48 guides the column assembly along the upper rail 29. Accordingly, X-axis displacement of the column assembly is transmitted to and directly drives the drive belt 41 to carry the associated second termination point of the cable 13 back and forth in the X-axis direction.

The cable 13 extends further from the upper track unit 32 for connection to the second or lower track unit 34 and ultimately for connection to the cassette pick-up unit 15. This cable routing is conveniently achieved as shown in FIGS. 5 and 7 by folding the cable 13 at the cable clamp 44 on the drive belt 41 so that the cable 13 extends laterally at about 90 degrees from the clamp beneath the bracket 46. One or more of the conductors within the cable may be tapped at this point for connection to the column assembly 28, for example, connection to pick-up unit position sensors (not shown) or the like. The cable 13 then extends further into the upper end of a vertically oriented guide channel 50 of the second track unit 34 forming a portion of the column assembly 28.

The second or lower track unit 34 functions to accommodate Y-axis cable movement, in generally the same manner as the upper track unit 32. More specifically, with reference to FIGS. 3, 6 and 8 the cable 13 extends downwardly into the upper end of the elongated guide channel 50 which has a generally U-shaped configuration opening toward the support post 30. The cable 13 is draped along the inboard side of one channel side wall 51, and is secured thereto at or near a longitudinally centered position by a clamping foot 52. This clamping foot 52 is similar in construction to the clamping foot 39 of the upper track unit and is carried at one end of a secondary support shelf 53 mounted on the guide channel 50 in parallel spaced relation with the cable and extending toward the channel upper end. Conveniently, upon rapid column assembly displacement in the X-axis direction, the secondary support shelf 53 prevents contact between the draped cable portions. From the clamping foot 52, the cable 13 is suspended further along the guide channel wall 51 to cable turn 13" whereat it is rolled over upon itself through an angle of 180 degrees prior to connection to an adjacent, parallel drive belt 54 by means of a belt clamp 56. This drive belt 54, like the above-described belt 41, is supported on rollers 58 but oriented for up and down translation parallel to the channel 50 to translate the belt clamp 56 and cable 13 thereat in the Y-axis direction. Importantly, the spacing between the drive belt 54 and the channel side wall 51 are selected to be slightly less than twice the natural radius of cable curvature at the cable turn 13", whereby the cable is compressed at the cable turn 13' to apply a resultant force acting upon the drive belt 54.

When the drive belt 54 is translated rapidly up and down, the cable 13 is displaced rapidly and positively in the Y-axis direction due to the resultant dual points of effective drive connection between the belt 54 and the cable 13. More particularly, the belt 54 positively drives the cable at the clamp 56 and also insures smooth coiling action of the cable 13 as it passes through the cable turn 13" to permit rapid Y-axis cable displacement substantially without significant loads on the belt and without relative sliding motion between the cable and belt. Accordingly, the second track unit 34 accommodates cable displacement between the termination points defined by the clamping foot 52 and the cable clamp 56, thereby permitting cable movement along a second direction. Moreover, to minimize cable wear, low friction material or coating can be used to define cable contacted surfaces of the shelf 53 and the channel 50, if desired.

Figure 8:
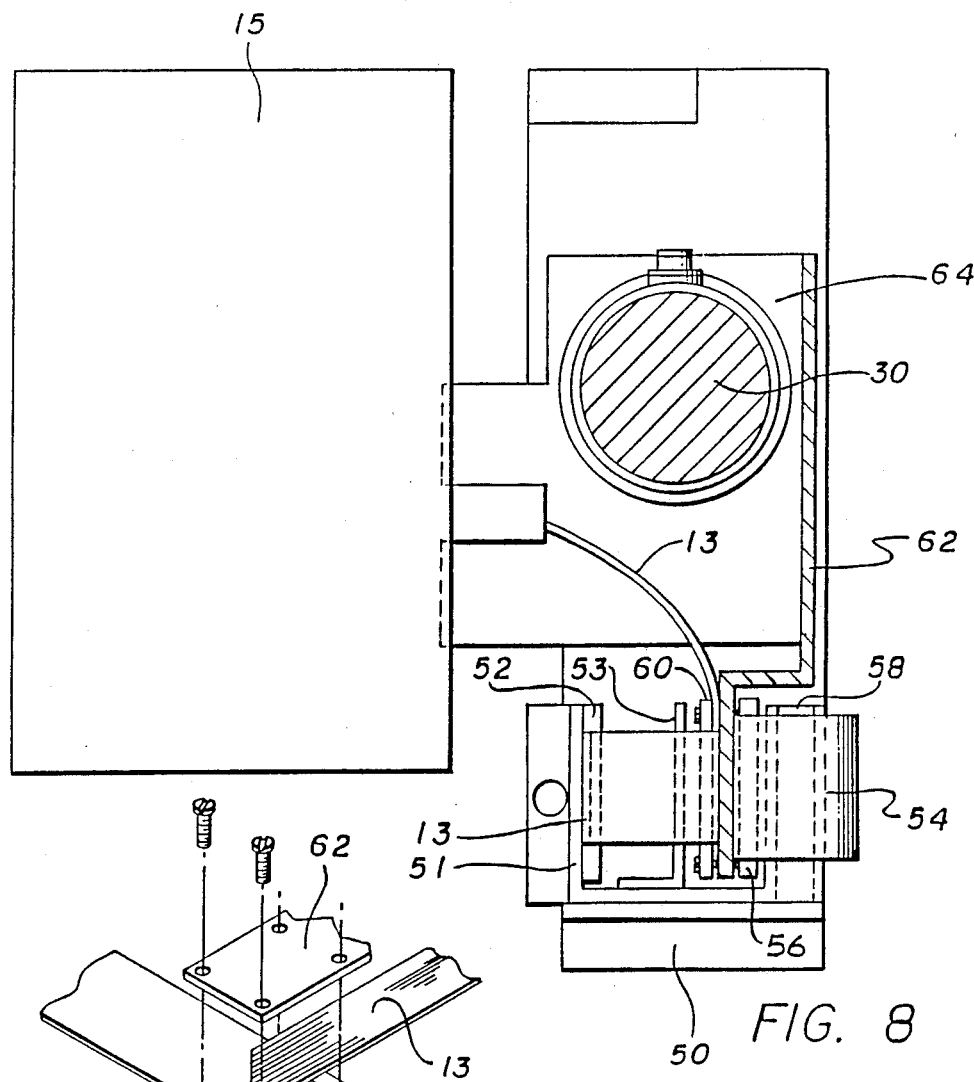
FIG. 8 is an enlarged fragmented horizontal sectional view taken generally on the line 8—8 of FIG. 3.
Figure 9:
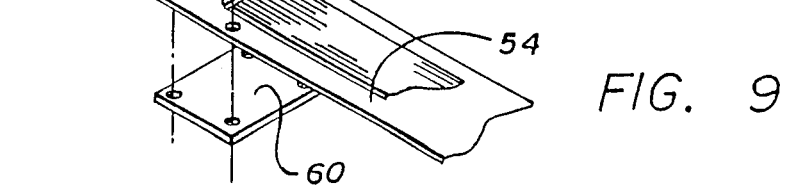
FIG. 9 is an exploded fragmented perspective view depicting clamp plates for securing the flexible member to a second, movable termination point within the other one of the track units.

As shown in FIGS. 8 and 9, the cable clamp 56 permits further cable extension from the track unit 34 for appropriate electrical connection to components on the pick-up unit 15. As shown, the cable clamp 56 includes a plate 60 and a cantilevered bracket 62 having the cable 13 and the belt 54 sandwiched therebetween. The cable 13 is folded on itself within this sandwich and extends laterally therefrom for connection to the pick-up unit 15. The cantilevered bracket 62 is secured in turn to a bearing member 64 which supports the pick-up unit for Y-axis displacement along the support post 30. Accordingly, Y-axis displacement of the pick-up unit 15 pursuant to operation of the drive means 27 (FIG. 2) is transmitted by the bracket 62 to achieve a directly corresponding Y-axis displacement of the drive belt 54 and associated cable termination point.

The cable mounting assembly of the present invention thus provides an effective apparatus and method for rapidly displacing the cable along one or more directions with minimal cable stress and wear. Moreover, while the invention has been described in detail with respect to the translation of a flat ribbon conductor cable, other types of conductor cables and other types of flexible connectors such as hydraulic or pneumatic tubing or the like may be similarly translated, as desired.

A variety of modifications and improvements to the flexible member supporting and guiding assembly described herein are believed to be apparent to those skilled in the art. Accordingly, no limitation on the invention is intended by the description or drawings herein, except as set forth in the appended claims.

What is claimed is:

1. In apparatus having a frame, a movable component, and means for displacing the movable component within a plane of motion, a mounting assembly comprising:

a flexible member connected between said frame and said movable component;

first and second track units each including an elongated guide member, a movable member parallel with said guide member and spaced therefrom by a distance less than twice a natural radius of curvature of said flexible member, when said flexible member is rolled back upon itself through a turn of 180 degrees, means for securing said flexible member at a first termination point to said guide member and at a second termination point to said movable member, said first and second termination points being spaced along the length of said flexible member, the portion of the flexible member between said first and second termination points extending along said guide member and rolling back upon itself, through a turn of 180 degrees, to extend along said movable member;

said flexible member extending further between said second termination point of said first track unit and said first termination point of said second track unit;

means for mounting said first track unit on said frame with said guide member and movable member thereof extending generally in a first direction;

means for mounting said second track unit for displacement relative to said frame with said first track unit, and with said guide member and said moveable member of said second track unit extending generally in a second direction;

means for displacing said movable member of said first track unit together with said second track unit back and forth in the said first direction; and means for displacing said movable member of said second track unit in the said second direction.

2. The mounting assembly of claim 1 wherein said flexible member comprises a flexible electrical conductor cable.

3. The mounting assembly of claim 2 wherein said cable comprises a multiconductor flat ribbon cable.

4. The mounting assembly of claim 1 wherein said first termination point for each of said track units is positioned generally at a longitudinally centered position along said guide member.

5. The mounting assembly of claim 1 wherein said guide member for each of said track units comprises a guide channel having a base for supporting said flexible member and relatively short side walls extending along opposite sides of said base.

6. The mounting assembly of claim 1 wherein said flexible member securing means for each of said track units comprises a pair of clamps for respectively securing said flexible member to said guide member and to said movable member.

7. The mounting assembly of claim 1 wherein said second track unit is oriented with one end thereof generally adjacent said movable member of said first track unit.

8. The mounting assembly of claim 1 wherein said flexible member has a length between said first and second termination points for each of said track units sufficient to enable displacement of said movable member of said first track unit throughout an X-axis range of motion in a X-Y plane of said movable component and to enable displacement of said movable member of said second track unit throughout a Y-axis range of motion in the X-Y plane of said movable component.

9. The mounting assembly of claim 1 further including means for connecting said movable member of said second track unit to said movable component.

10. The mounting assembly of claim 1 wherein said movable member for each of said track units comprises a drive belt.

11. The mounting assembly of claim 1 wherein said flexible member extends from said frame generally into one end of said guide member of said first track unit and further to said first termination point thereof, said first track unit further including a secondary support shelf mounted on said guide member thereof between said movable member and the portion of said flexible member extending from said one end of said guide member to said first termination point.

12. The mounting assembly of claim 11 wherein said securing means for said first track unit includes a clamping foot mounted on said secondary support shelf.

13. The mounting assembly of claim 1 wherein the portion of said flexible member connected between said first and second track units is threaded generally into one end of said guide member of said second track unit and further to said first termination point thereof, said second track unit further including a secondary support shelf mounted on said guide member thereof between said movable member and the portion of said flexible member threaded into said guide member and extending to said first termination point.

14. The mounting assembly of claim 13 wherein said securing means for said second track unit includes a clamping foot on said secondary support shelf.

15. The mounting assembly of claim 1 wherein said guide members of said track units have surfaces for supporting contact with said flexible member, said supporting contact surfaces being defined by a relatively low friction material.

16. The mounting assembly of claim 1 including a cassette storage library disposed generally adjacent said track units and defined by an array of cassette storage bins, and a cassette playback unit disposed generally alongside said storage library, the movable component comprising a cassette pick-up and release unit for transferring selected cassettes between said storage library and said playback unit.

17. In apparatus having a frame, a movable component, and means for displacing the movable component, a mounting assembly comprising:
a flexible member connected between the frame and the movable component;
a track unit on said frame and having an elongated guide member, a movable member parallel with said guide member and spaced therefrom by a distance less than twice the natural radius of curvature of said flexible member, when said flexible member is rolled back upon itself through a turn of 180 degrees, means for securing said flexible member at a first termination point to said guide member and at a second termination point to said movable member, said first and second termination points being spaced along the length of said flexible member, the portion of the flexible member between said first and second termination points extending along said guide member and rolling back upon itself through a turn of 180 degrees to extend along said movable member;
means for mounting said track unit on said frame with said guide member and said movable member extending generally in a first selected direction; and
means for displacing said movable member with said second termination point in said first selected direction to correspondingly displace said flexible member at said second termination point.

18. The mounting assembly of claim 17 wherein said flexible member comprises a conductor flexible member.

19. The mounting assembly of claim 17 wherein said first termination point is positioned generally at a longitudinally centered position along said guide member.

20. The mounting assembly of claim 17 wherein said flexible member extends from said frame generally into one end of said guide member and further along said guide member to said first termination point, and further including a secondary support shelf on said guide member between said movable member and the portion of said flexible member extending from said one end of said guide member to said first termination point.

21. The mounting assembly of claim 17 further including:
a second track unit having an elongated guide member, a movable member extending generally in parallel with said guide member and spaced therefrom by a distance less than twice the natural radius of curvature of said flexible member, when said flexible member is rolled back upon itself through a turn of 180 degrees, means for securing said flexible member at a first termination point to said guide member and at a second termination point to said movable member, said first and second termination points being spaced from each other, the portion of the flexible member between said first and second termination points extending along said guide member and rolling back upon itself through a turn a 180 degrees to extend along said movable member;

said flexible member extending between said second termination point on said frame-mounted track unit and said first termination point on said second track unit;

means for mounting said second track unit for movement together with said movable member of said frame-mounted track unit in said first selected direction and with said second track unit oriented to extend generally in a second selected direction; and means for displacing said movable member with said second termination point of said second track unit in said second selected direction to correspondingly displace said flexible member.

22. In apparatus having a first component moveable relative to a second component, a mounting assembly comprising:

a flexible member connected between said first and second components;

a guide mounted on said first component and extending in a first direction;

means for securing said flexible member at a first termination point stationary relative to said guide;

a movable member mounted in spaced relation with said guide and extending in said first direction with a spacing from said guide at least slightly less than twice the natural radius of curvature of said flexible member, when said flexible member is rolled back upon itself through a turn of 180 degrees;

means for securing said flexible member at a second termination point to said movable member means and at a position along said flexible member spaced from said first termination point; and means for displacing said movable member in said first direction and in accordance with movement of said second component in said first direction to correspondingly displace said flexible member at said second termination point relative to said first termination point.

23. In apparatus having a frame, a column assembly supported on the frame for displacement in a X-axis direction, a movable carriage supported on the column assembly for displacement in a second direction, and means for driving the column assembly and the carriage in the X-axis and Y-axis directions, respectively, a mounting assembly comprising:

a flexible cable connected between the frame and the carriage;

X-axis and Y-axis track units each including an elongated guide channel, a movable drive belt extending in parallel with said guide channel and spaced therefrom by a distance less than twice the natural radius of curvature of said cable, when said cable is rolled back upon itself through a turn of 180 degrees, means for securing said cable at a first termination point to said guide channel and at a second termination point to said drive belt, said first and second termination points being spaced along the length of said cable, the portion of the cable between said first and second termination points extending along said channel and rolling back upon itself through a turn of 180 degrees to extend along said drive belt;

said cable extending further between said second termination point of said X-axis track unit and said first termination point of said Y-axis track unit;

means for mounting said X-axis track unit on said frame to extend generally in the Y-axis direction;

means for mounting said Y-axis track unit on said column assembly to extend generally in a Y-axis direction;

means for coupling said drive belt of said X-axis track unit for X-axis displacement of said drive belt and said second termination point of said X-axis track unit with said column assembly; and means for coupling said drive belt of said second track unit for Y-axis displacement of said drive belt and said second termination point of said Y-axis track unit with said carriage.

24. The mounting assembly of claim 23 wherein said flexible cable comprises a multiconductor flat ribbon cable.

25. The mounting assembly of claim 23 wherein said first termination point for each of said track units is positioned generally at a longitudinally centered position along said guide channel.

26. In apparatus having a frame, a movable component, and means for displacing the movable component, a method of supporting a flexible member connected between the frame and the movable component, the method comprising:

mounting a track unit on said frame, said track unit having an elongated guide member;

disposing a movable member on the moveable component and parallel with said guide member;

spacing said guide member from said moveable member by a distance less than twice the natural radius of curvature of said flexible member, when said flexible member is rolled back upon itself through a turn of 180 degrees;

securing said flexible member at a first termination point to said guide member;

securing said flexible member at a second termination point to said movable member;

spacing said first and second termination points along the length of said flexible member;

positioning the portion of the flexible member between said first and second termination points to extend along said guide member and roll back upon itself through a turn of 180 degrees to extend along said movable member;

mounting said track unit on said frame with said guide member and said movable member extending generally in a first selected direction; and displacing said movable member with said second termination point in said first selected direction to correspondingly displace said flexible member at said second termination point.

27. The method of claim 26 wherein the track unit on the frame comprises the first track unit displacing the flexible member in a first direction with the moveable component, relative to the frame, the method further including:

mounting a second track unit on the first track unit for movement therewith in the first direction, the second track unit having a guide member a movable member disposed in spaced relation to each other with a spacing therebetween at least slightly less than twice the natural radius of curvature of the flexible member when the flexible member is rolled back upon itself through a turn of 180 degrees, the second track unit being oriented to extend in a second direction;

threading the flexible member from the second termination point of said first track unit into the guide member of the second track unit and securing the flexible member to a first termination point relative to the guide member of the second track unit;

securing the flexible member to the movable member of the second track unit at a second termination point spaced from the first termination point of the second track unit;

moving the portion of the flexible member extending between the termination points of the second track unit to extend along the guide member thereof and then to roll back upon itself through a turn of 180 degrees to extend along the movable member thereof; and coupling the movable member of the second track unit to the second component for movement therewith in the second direction to correspondingly displace the flexible member at the second termination point of the second track unit.

28. The method of claim 27 including:

connecting the flexible member between the second component and the second termination point of the second track unit.

29. The method of claim 27 including locating said first termination point generally at a longitudinally centered position relative to the guide member.

* * * * *